United States Patent [19]

Ahn

[11] Patent Number: 4,781,339
[45] Date of Patent: Nov. 1, 1988

[54] TAPE CASSETTE LOADING AND REEL BRAKING MECHANISM

[75] Inventor: Ki H. Ahn, Choongchungnam, Rep. of Korea

[73] Assignee: Goldstar Co., Ltd., Seoul, Rep. of Korea

[21] Appl. No.: 948,157

[22] Filed: Dec. 31, 1986

[30] Foreign Application Priority Data

Dec. 31, 1985 [KR] Rep. of Korea .......... 18415/1985[U]

[51] Int. Cl.⁴ .............................................. G11B 5/008
[52] U.S. Cl. ..................................... 242/199; 360/96.5
[58] Field of Search ................... 360/96.5, 96.1, 96.2, 360/96.3, 96.4, 96.6; 242/204, 199, 198

[56] References Cited

U.S. PATENT DOCUMENTS

| | | | |
|---|---|---|---|
| 4,452,409 | 6/1984 | Takai | 360/74.1 X |
| 4,577,246 | 3/1986 | Matsuki | 360/96.5 |
| 4,586,096 | 4/1986 | Okada | 360/96.5 |
| 4,679,745 | 7/1987 | Kim | 242/204 X |
| 4,708,302 | 11/1987 | Yamaguchi | 360/963 X |

FOREIGN PATENT DOCUMENTS

| | | | |
|---|---|---|---|
| 58-97155 | 6/1983 | Japan | 360/96.5 |
| 59-54066 | 3/1984 | Japan | 360/96.5 |
| 59-52451 | 3/1984 | Japan | 360/96.5 |
| 59-139164 | 8/1984 | Japan | 360/96.5 |

Primary Examiner—Stuart S. Levy
Assistant Examiner—Katherine Matecki
Attorney, Agent, or Firm—Birch, Stewart, Kolasch & Birch

[57] ABSTRACT

An apparatus for loading or unloading a tape cassette by using an existent capstan motor without a separate motor and for actuating main brakes onto reel tables by means of an electric solenoid and an actuating plate without use of a ratchet gear.

1 Claim, 4 Drawing Sheets

TAPE CASSETTE LOADING AND REEL BRAKING MECHANISM

BACKGROUND OF THE INVENTION

The present invention relates to a tape cassette loading and reel brake assembly, and more particularly to a cassette loading mechanism employing an existent capstan motor as a driving means and a reel brake device which is actuated by means of an electric solenoid and an actuating plate without using a ratchet gear.

In a conventional VCR, a separate motor is provided for actuating the cassette holder and thus it makes the construction complicated and raises the production cost. Further, when either the Fast Forward (FF) mode or Rewind (REW) mode is converted into a stop mode, various components, such as ratchet gears, are used as quick brake devices. However, such a brake device causes a big noise and malfunction due to its complicated and complex construction.

BRIEF SUMMARY OF THE INVENTION

It is therefore an object of the present invention to provide a cassette loading mechanism employing an existing capstan motor as a driving source.

It is another object of the present invention to provide a quick brake device which is actuated by a simple electric solenoid.

To this end, the present invention comprises a connecting gear secured to an axle of a worm, an intermediate gear rotatably mounted to a main chassis and interlocked with the connecting gear, a driving gear secured to a flywheel of a capstan motor slidably engaged with the intermediate gear, a movable gear mounted to a pin of a triangular movable plate which is pivotally connected to the main chassis with an axis, a coil spring of which one end is fixed to a side of the movable plate and the other end is fixed to the main chassis, and an electric solenoid adapted to receive one end of an actuating plate, with rectangular openings disposed on the actuating plate for receiving an actuating pin of the movable plate and a contacting pin of a main brake, respectively.

BRIEF DESCRIPTION OF THE DRAWINGS

These and other objects and advantages of the invention will become more apparent from the following description taken in connection with the appended drawings in which.

DETAILED DESCRIPTION

Figure 1:
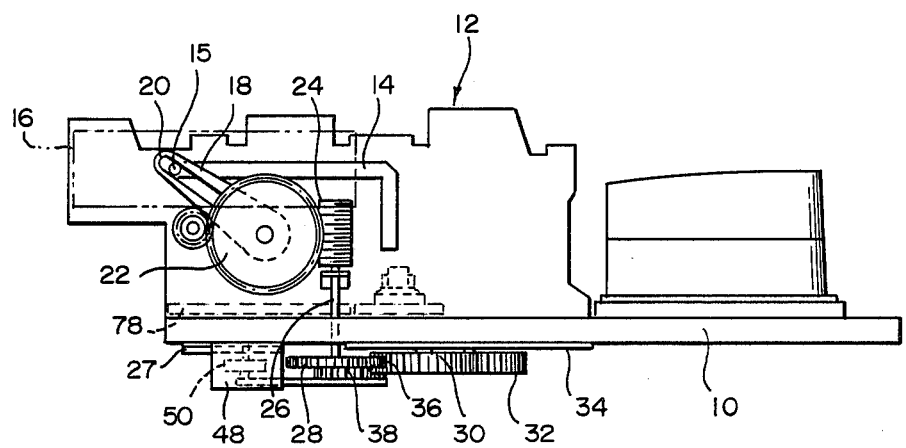
FIG. 1 is a front elevational view of the loading mechanism according to the present invention.

Referring first to FIG. 1, there is shown a front elevational view of the cassette loading mechanism according to the present invention. A main chassis 10 includes a housing bracket 12 which contains an inverted L-shape guide groove 14 therein. A guide rod 15 of a cassette holder 16 is disposed in the guide groove 14. The guide rod 15 is further slidably engaged with a longitudinal slot 18 of an actuating arm 20 secured to a worm wheel 22 through an axle. The worm wheel 22 is interlocked with a worm 24 which is mounted to a shaft 26 of a connecting gear 28.

Figure 2:
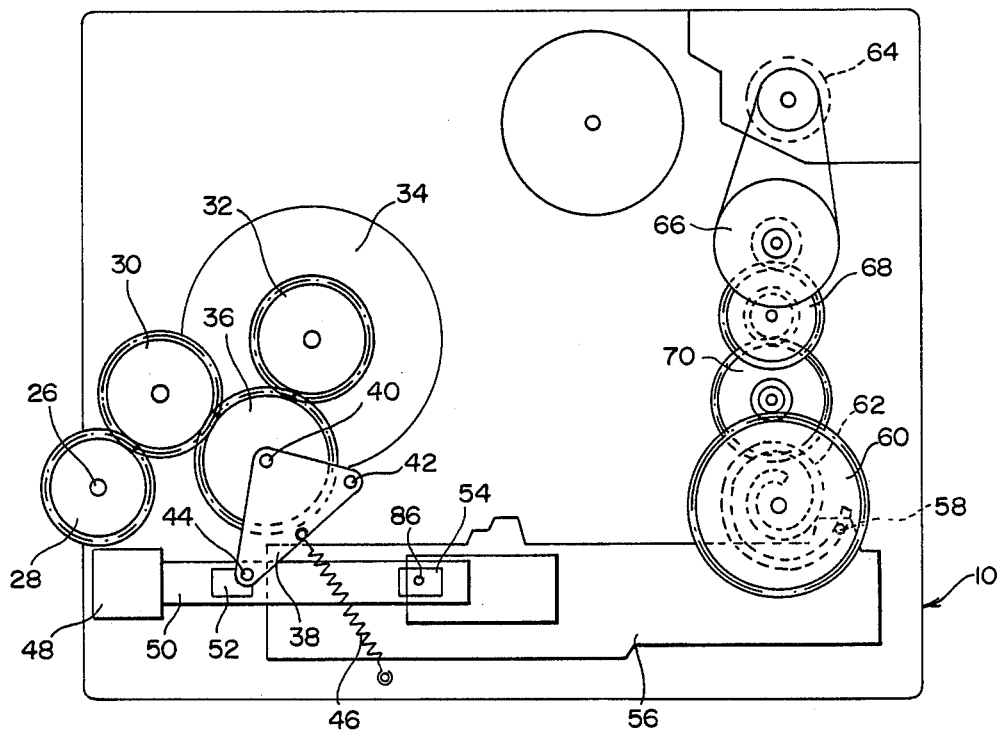
FIG. 2 is a bottom plan view showing the operation of the main components of the present invention in stop or eject mode.
Figure 3:
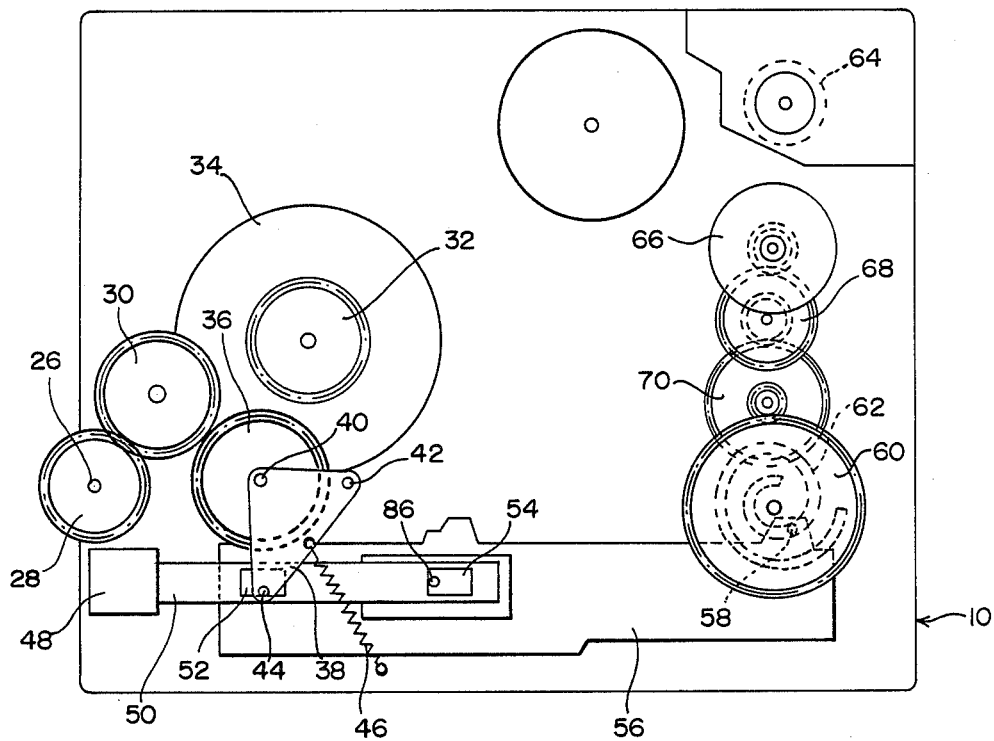
FIG. 3 is a bottom plan view showing the operation of the main components of FIG. 2 except in other modes than stop or eject mode.

Referring to FIGS. 2 and 3, there are shown the operations of the present invention in various modes. The connecting gear 28 is interlocked with an intermediate gear 30 below the main chassis 10. The intermediate gear 30 associated with a driving gear 32 is secured to a flywheel 34 of a capstan motor (not shown). Between the intermediate gear 30 and the driving gear 32, a movable gear 36 is positioned to be optionally interlocked therewith. The movable gear 36 is rotatably mounted to a pin 40 of a triangular movable plate 38 which is pivotally connected to the main chassis 10 through an axis 42. A coil spring 46 is provided to bias the movable plate 38 in the counter clockwise direction with the axis 42. One end of the coil spring 46 is fixed to a side of the movable plate 38 and the other end is fixed to the main chassis 10. An electric solenoid 48 is provided to receive one end of an actuating plate 50 disposed therein. The actuating plate 50 is provided with a front rectangular opening 52 in which an actuating pin 44 of the movable plate 38 is received and with a rear rectangular opening 54 in which a contacting pin 86 of a main brake 78 is received, as will be described hereinafter.

A connecting plate 56 is provided with a guide pin 58 which is slidably engaged with a spiral cam groove 62 of a cam gear 60, so that the connecting plate 56 is moved according to the cam gear 60 being rotated. The cam gear 60 is driven by means of a loading motor 64 through a pulley 66 and gears 68 and 70.

Figure 4:
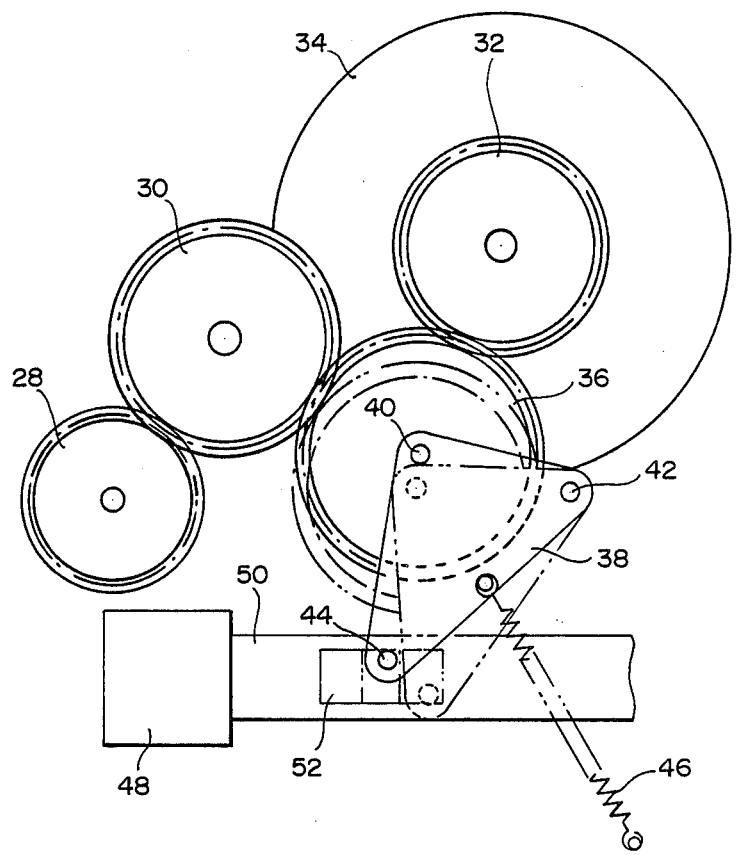
FIG. 4 is a bottom plan view in part showing the operation of the main components of the present invention.

Referring to FIG. 2, there is shown the operation of the invention in STOP or EJECT mode. When the solenoid 48 is energized to operate the actuating plate 50, the end corner of the opening 52 of the actuating plate 50 pulls the actuating pin 44 of the movable plate 38, as shown in solid line in FIG. 4, so that the movable gear 36 is interlocked with the intermediate gear 30 and the driving gear 32. Thereby, tape cassette can be loaded or unloaded by using the driving force of the existent capstan motor.

Referring to FIG. 3, there is shown the operation of the invention in various modes other than STOP or EJECT mode. In PLAY, FF/REW, CUE/REV or REC mode, the solenoid 48 is not operated so that the actuating plate 50 is biased from the solenoid 48. Thereafter the movable plate 38 is moved by the restoring force of the spring 46, as shown by the dotted line in FIG. 4. Thereby, the movable gear 36 is disengaged from the intermediate gear 30 and the driving gear 32 so that the cassette loading device is disconnected from the driving force of the capstan motor.

Figure 5:
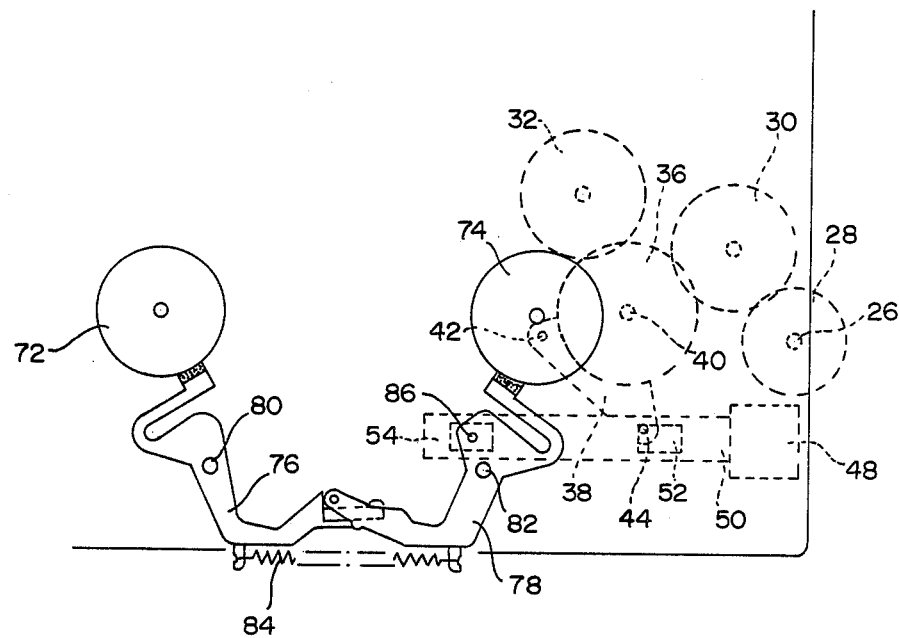
FIG. 5 is a top plan view showing the brake device according to the present invention.

Referring to FIG. 5, there is shown a top plan view showing how main brakes are activated according to the present invention. Reel tables 72 and 74 associated with corresponding supply and take-up reels of a cassette are installed on the main chassis 10. Main brakes 76 and 78 are pivotally connected to the main chassis 10 through pins 80 and 82, respectively, and are operatively engaged with the supply reel 72 and take-up reel 74. The main brakes 76 and 78 are interconnected to each other with a coil spring 84. The main brake 78 is provided with a contacting pin 86 which is received in the opening 54 of the actuating plate 50. Accordingly, when the solenoid 48 is energized in STOP mode, the solenoid 48 operates the actuating plate 50 so that the end corner of the opening 54 pulls the contacting pin 86 of the main brake 78. Thereby, the main brakes 76 and 78 may be simultaneously actuated onto the reels 72 and 74, since they are interconnected to each other by means of the coil spring 84.

As set forth hereinabove, the tape cassette loading or unloading and reel brake operation is simply effected according to the present invention without using a separate motor and a ratchet gear.

While there has been described a preferred form of the invention, obvious modifications and variations are possible in light of the above teachings. It is therefore to be understood that within the scope of the appended claim, the invention may be practiced otherwise than as specifically described.

What is claimed is:

1. A cassette loading and reel braking assembly comprising in combination, a main chassis, a housing bracket supported by said main chassis, a L-shape guide groove disposed in said housing bracket, a cassette holder disposed in said housing bracket, a guide rod mounted on said cassette holder disposed in said L-shape guide groove, a worm wheel disposed in said housing bracket, an actuating arm fixed to said worm wheel having a longitudinal guide groove which slidably engages said guide rod, a connecting gear having an axle, a worm mounted to said connecting gear axle interlocked with said worm wheel, an intermediate gear interlocked with said connecting gear below the main chassis, a driving gear secured co-axially to a flywheel which is associated with said intermediate gear, supply and take-up reel tables and main brakes, a triangular movable plate pivotally fixed to said main chassis through an axis, a coil spring connected to a side of said movable plate at one end of said coil spring and to said main chassis at the other end of said coil spring, a movable gear rotatably mounted to said triangular movable plate through a pin and positioned between said intermediate gear and said driving gear operatively interlocked therewith, and an electric solenoid adapted to receive one end of an actuating plate which includes rectangular openings disposed in both end portions thereof for receiving an actuating pin of said movable plate and a contacting pin of one of said main brakes, respectively, such that said solenoid is used to both actuate the brake and engage or disengage the gears of the cassette loading device.

* * * * *